(12) United States Patent
Kwan

(10) Patent No.: US 10,536,723 B2
(45) Date of Patent: Jan. 14, 2020

(54) METHOD AND SYSTEM FOR HIGH PERFORMANCE VIDEO SIGNAL ENHANCEMENT

(71) Applicant: Applied Research, LLC, Rockville, MD (US)

(72) Inventor: Chiman Kwan, Rockville, MD (US)

(73) Assignee: Applied Research, LLC, Rockville, MD (US)

( * ) Notice: Subject to any disclaimer, the term of this patent is extended or adjusted under 35 U.S.C. 154(b) by 124 days.

(21) Appl. No.: 15/259,447

(22) Filed: Sep. 8, 2016

(65) Prior Publication Data

US 2018/0070108 A1    Mar. 8, 2018

(51) Int. Cl.

| | | |
|---|---|---|
| H04N 7/24 | (2011.01) | |
| H04N 7/12 | (2006.01) | |
| H04N 11/02 | (2006.01) | |
| H04B 1/66 | (2006.01) | |
| H04L 1/00 | (2006.01) | |
| H04N 19/895 | (2014.01) | |
| H04N 19/176 | (2014.01) | |
| H04N 19/182 | (2014.01) | |

(52) U.S. Cl.
CPC ......... *H04N 19/895* (2014.11); *H04N 19/176* (2014.11); *H04N 19/182* (2014.11)

(58) Field of Classification Search
CPC .... H04N 19/895; H04N 19/37; H04N 19/182; H04N 19/176; H04L 25/0242
USPC ................................................... 375/240, 40
See application file for complete search history.

(56) References Cited

U.S. PATENT DOCUMENTS

| 8,976,873 | B2* | 3/2015 | Celetto | H04N 7/68 |
| | | | | 375/240.27 |
| 9,756,356 | B2* | 9/2017 | Yang | H04N 19/895 |
| 9,883,202 | B2* | 1/2018 | He | H04N 19/577 |
| 2005/0157799 | A1* | 7/2005 | Raman | H04N 19/51 |
| | | | | 375/240.27 |
| 2009/0103617 | A1* | 4/2009 | Au | H04N 19/176 |
| | | | | 375/240.13 |

OTHER PUBLICATIONS

D. Nguyen, M. Dao and T.D. Tran, "Video Error Concealment using Sparse Recovery and Local Dictionaries," IEEE Int. Conf. on Acoustics, Speech, and Signal Processing (ICASSP), May 2011.
Wei-Ying Kung, Chang-Su Kim, and C.-C. Jay Kuo, "Spatial and Temporal Error Concealment Techniques for Video Transmission Over Noisy Channels," IEEE Trans. on Circuits and Systems for Video Technology, vol. 16, No. 7, Jul. 2006.
J. Zhou, C. Kwan, and B. Ayhan, "A High Performance Missing Pixel Reconstruction Algorithm for Hyperspectral Images," 2nd. International Conference on Applied and Theoretical Information Systems Research, Taipei, Taiwan, Dec. 27-29, 2012.

* cited by examiner

*Primary Examiner* — Susan E. Hodges
(74) *Attorney, Agent, or Firm* — IP-R-US, LLC; Peter S. Wong

(57) ABSTRACT

The present invention provides a method and system to conceal video errors due to lost packets in the transmission without incurring additional bandwidth usage. The present invention is to use current and previous frames to search for similar patches for the corrupted blocks in the current frame. The search process speed for locating the lost packets is significantly improved by incorporating a smart search concept. The concealment algorithm of the present invention can be implemented in GPUs and multi-core CPUs.

5 Claims, 12 Drawing Sheets

Packet Loss Error Concealment Architecture

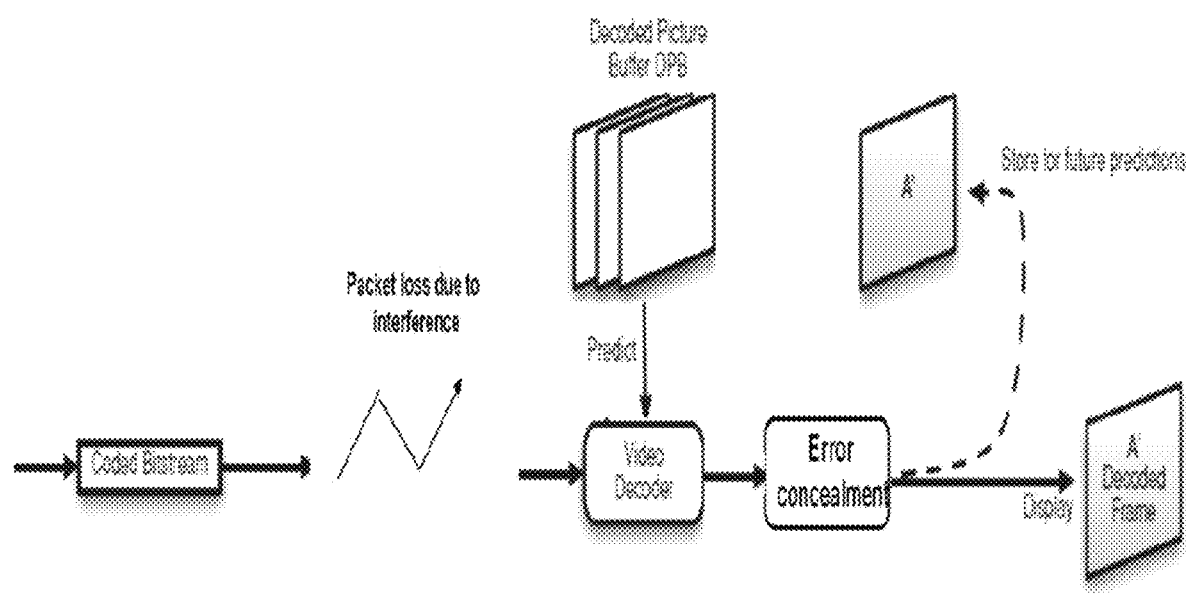
Fig. 1 Packet Loss Error Concealment Architecture

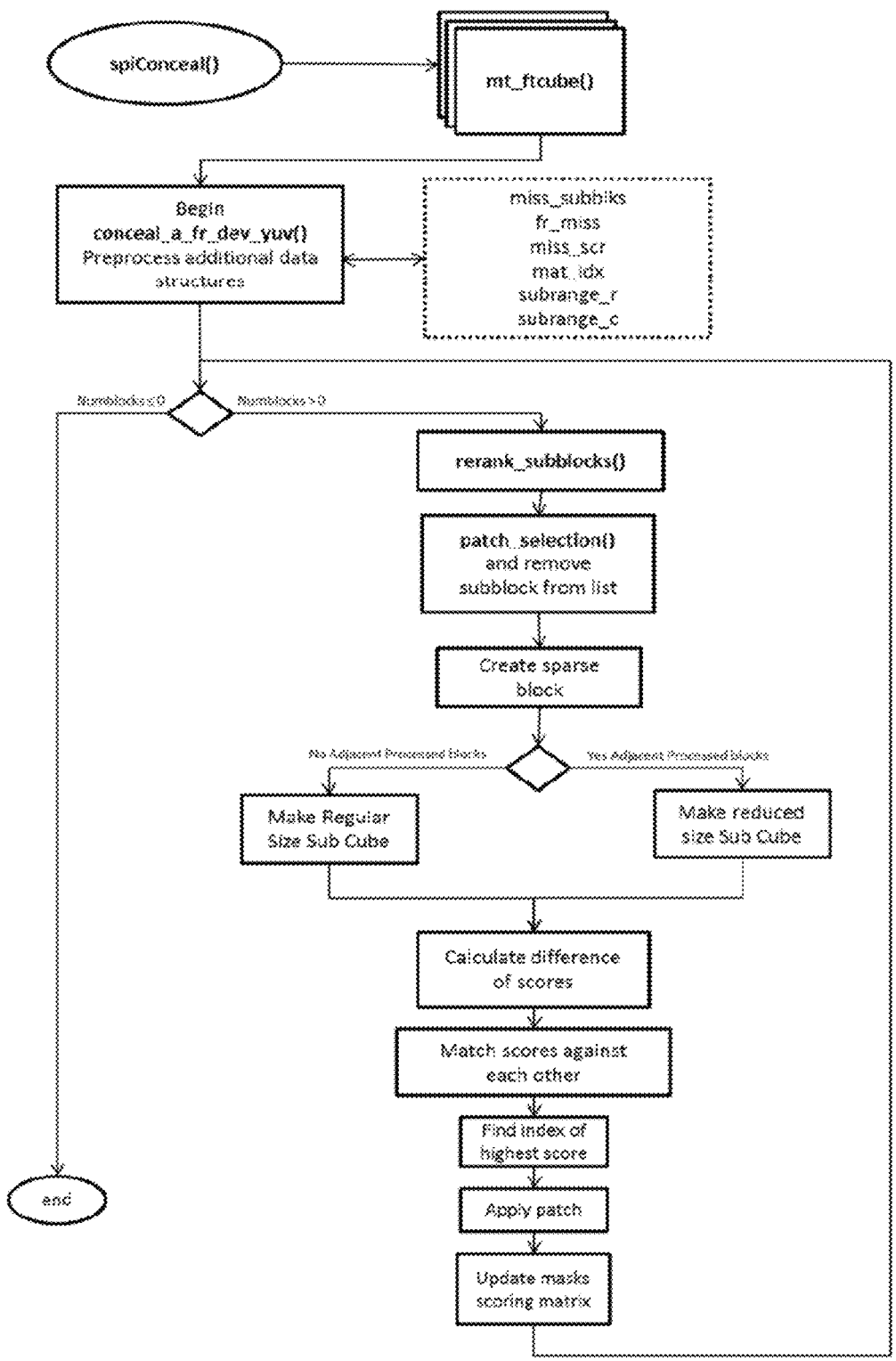
Fig. 2 Baseline Flow Chart with Smart Adjacent Search

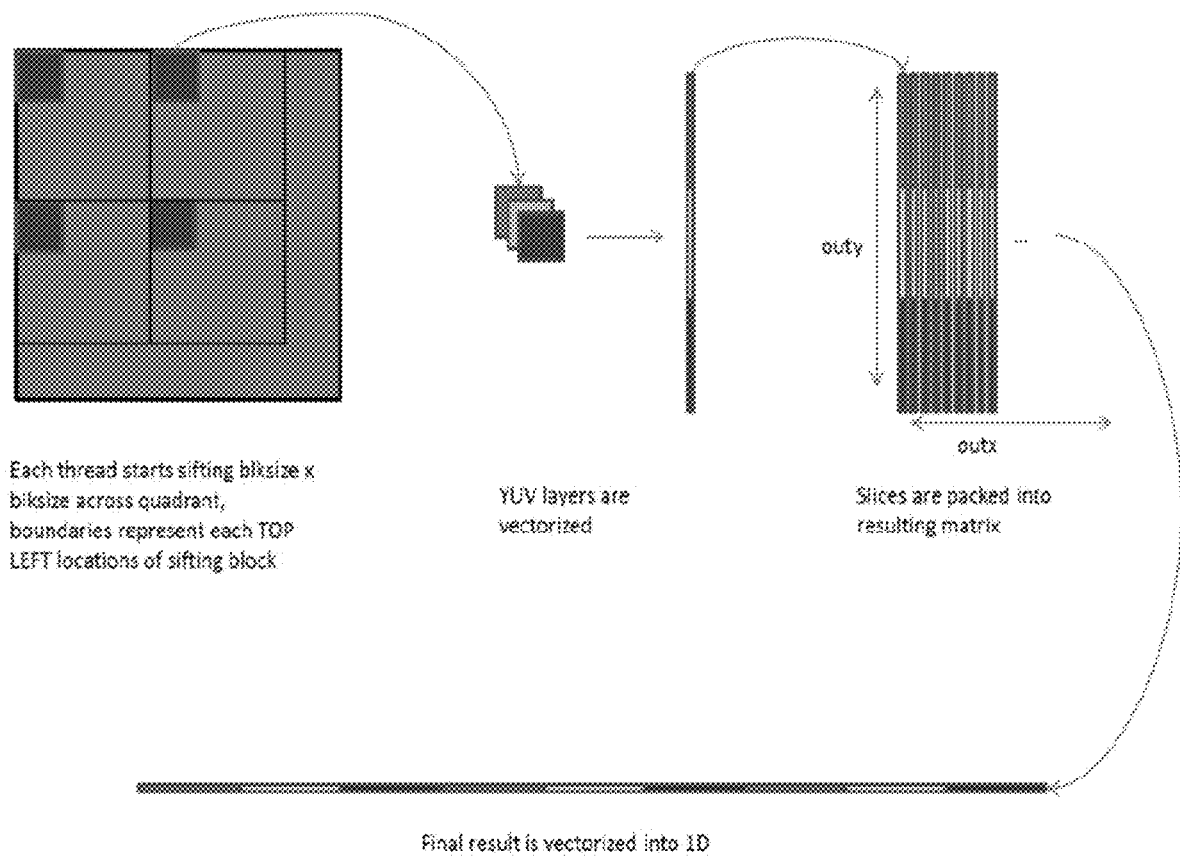
Fig. 3 Reference Data Cube Creation Using Multiple Workers

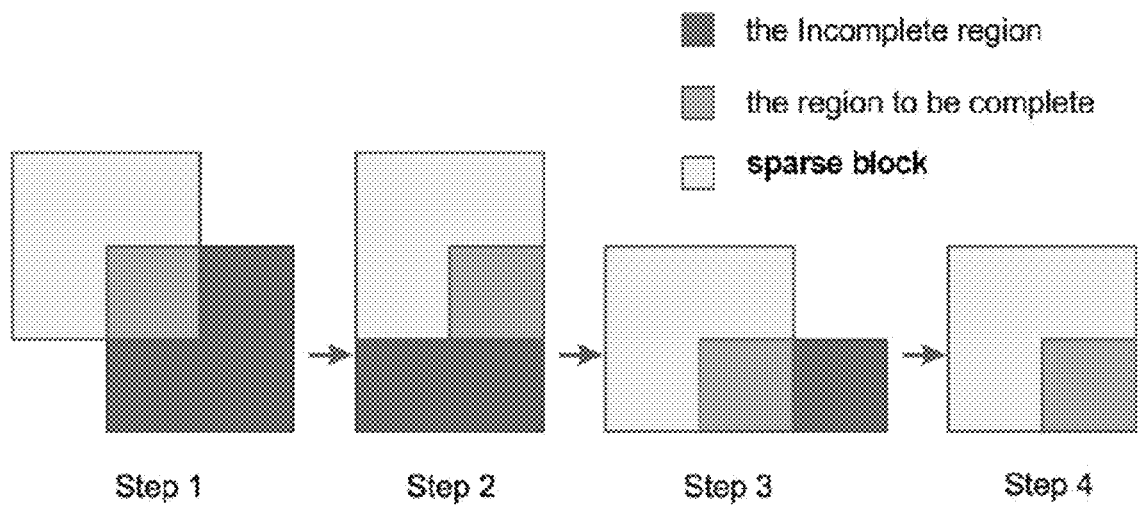
Fig. 4 Concealment Steps for a MB

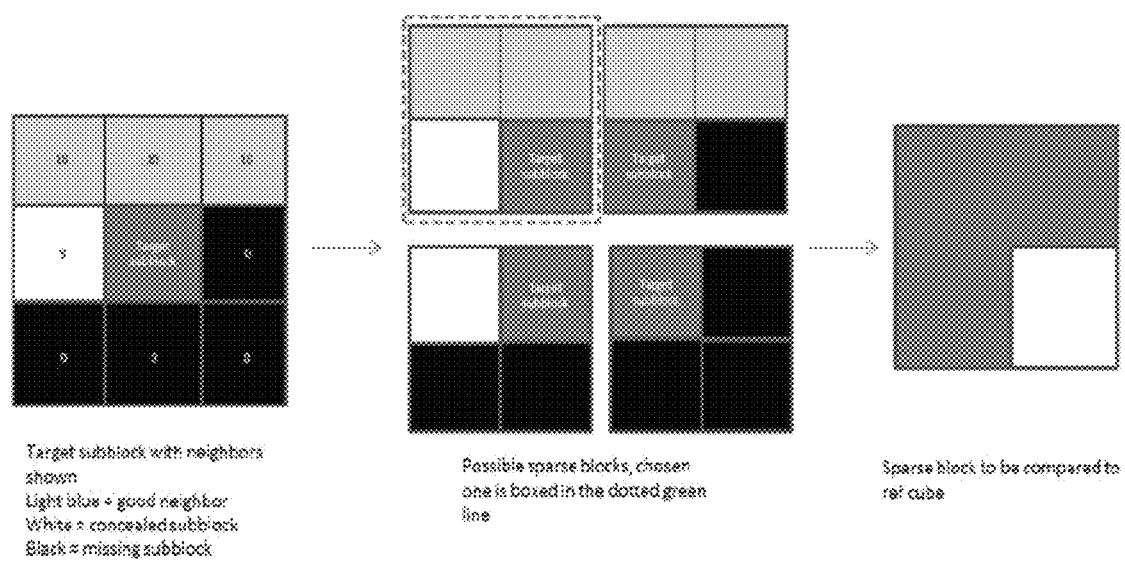
Fig. 5 Patch Selection.

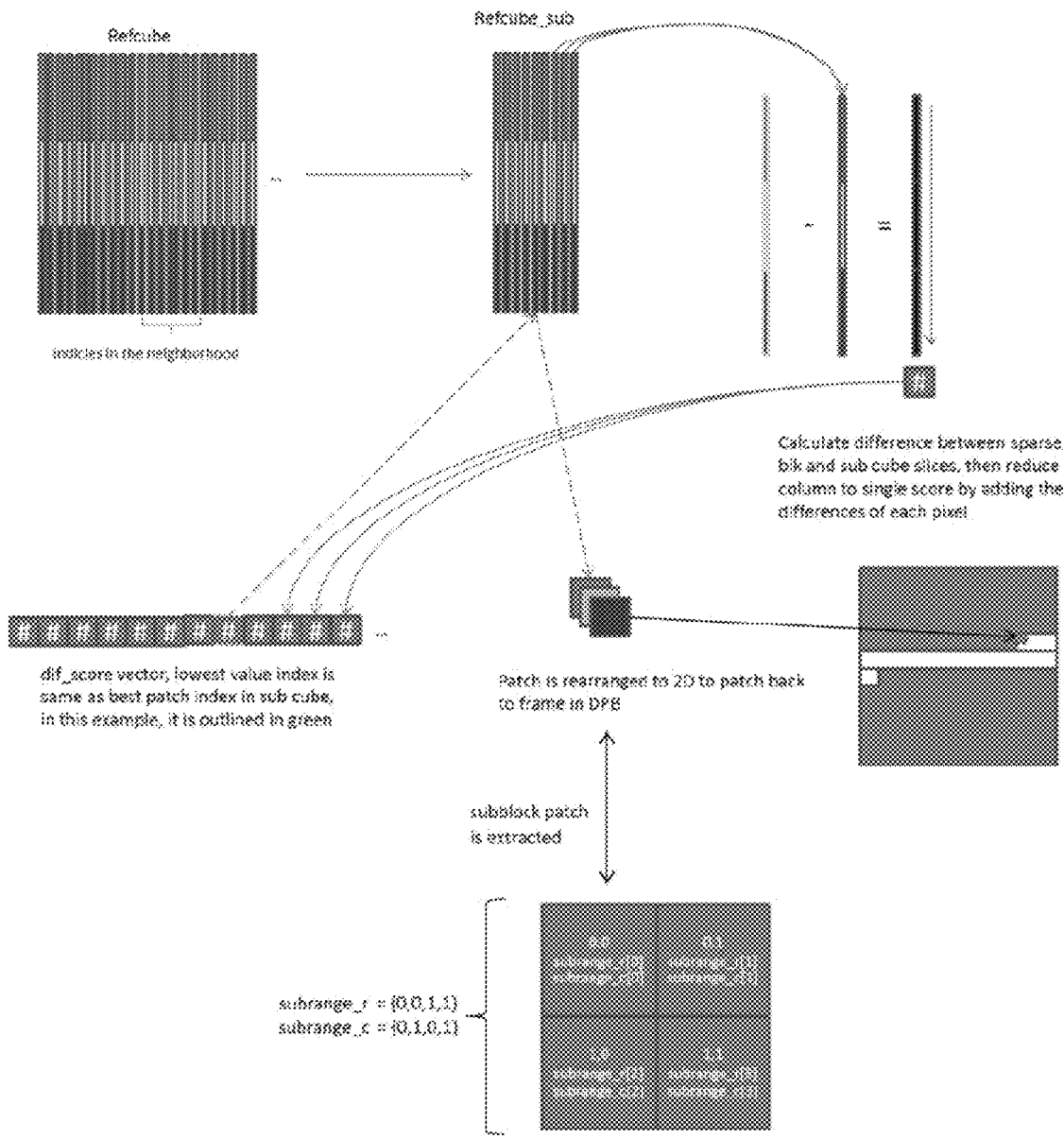
Fig. 6 Patch Search in Previous Frame Neighborhood

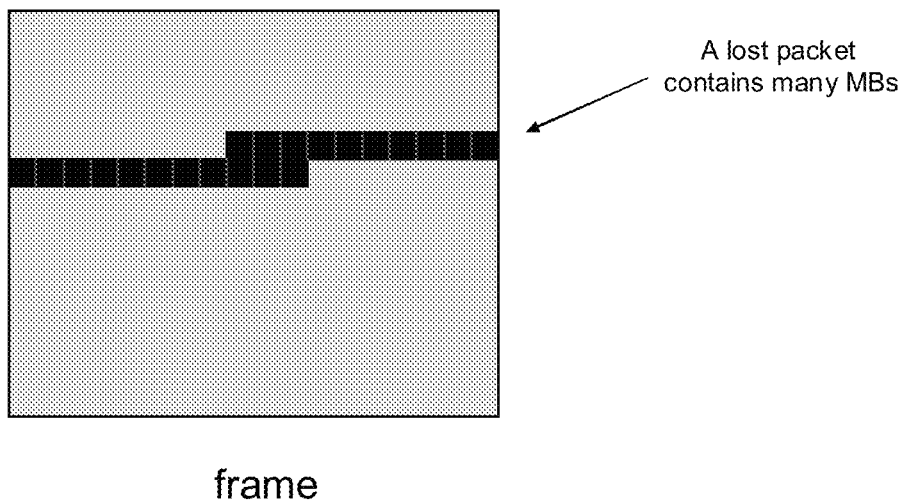
Fig. 7 Lost Packet with Damaged Sequential Order MBs

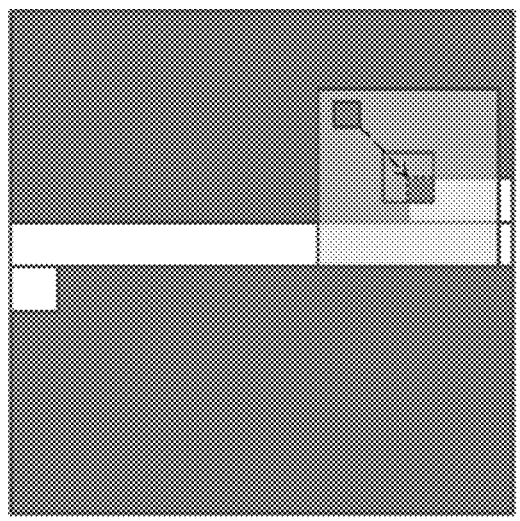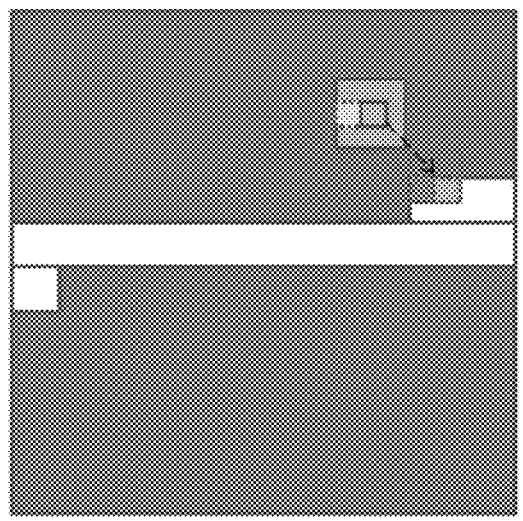
Fig. 8 Smart Adjacent Search

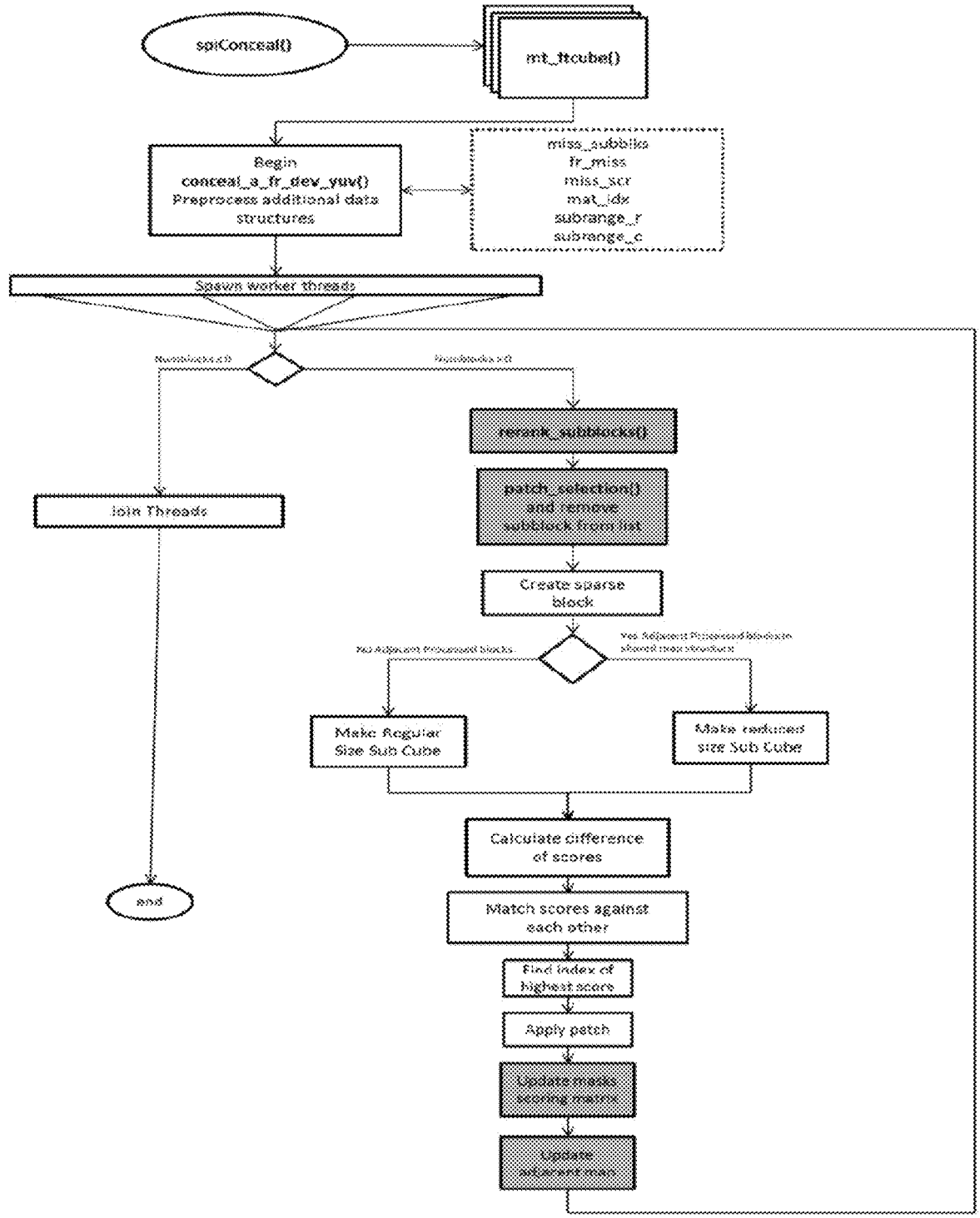
Fig. 9 Multithreaded Workflow

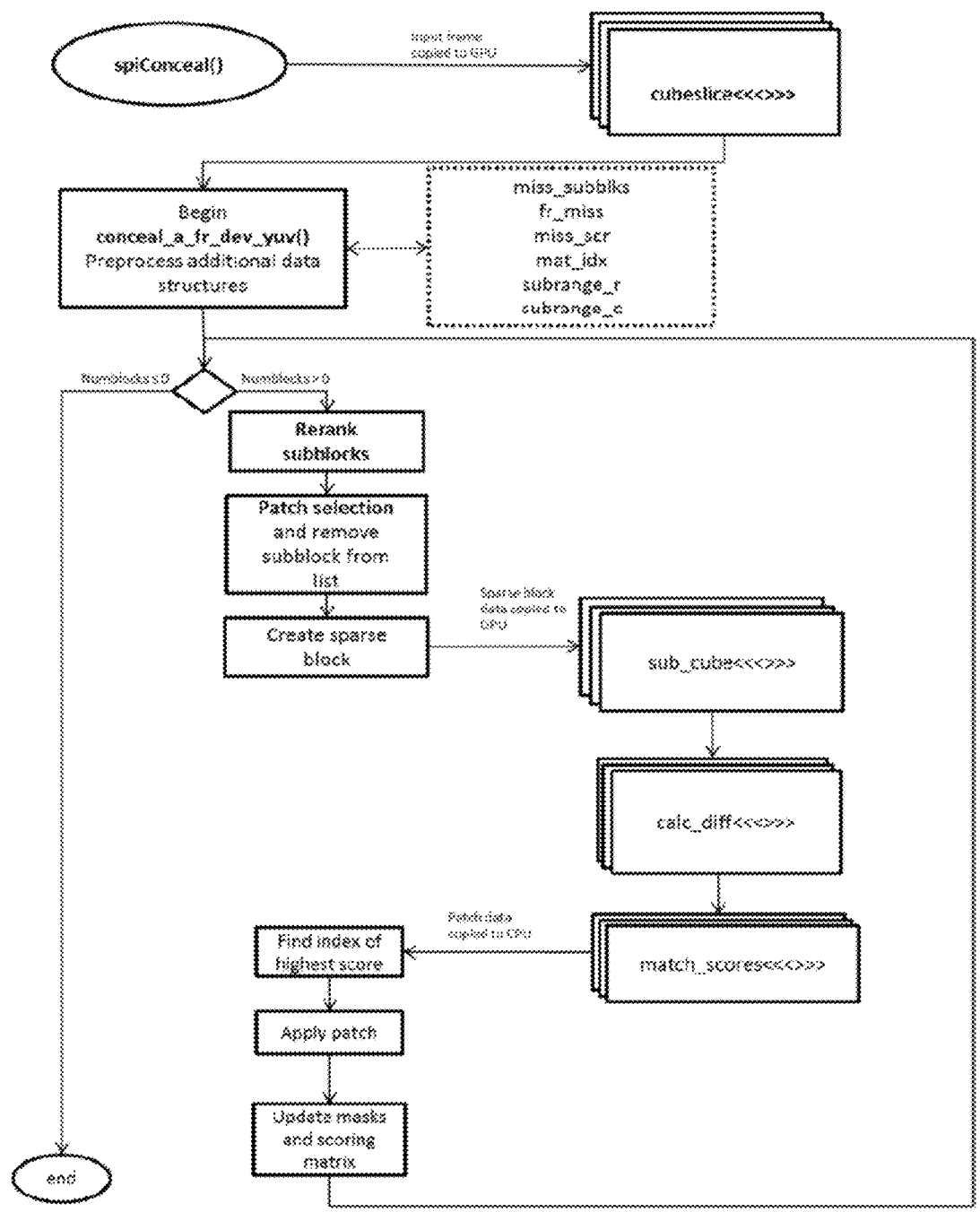
Fig. 10 GPU Approach Workflow

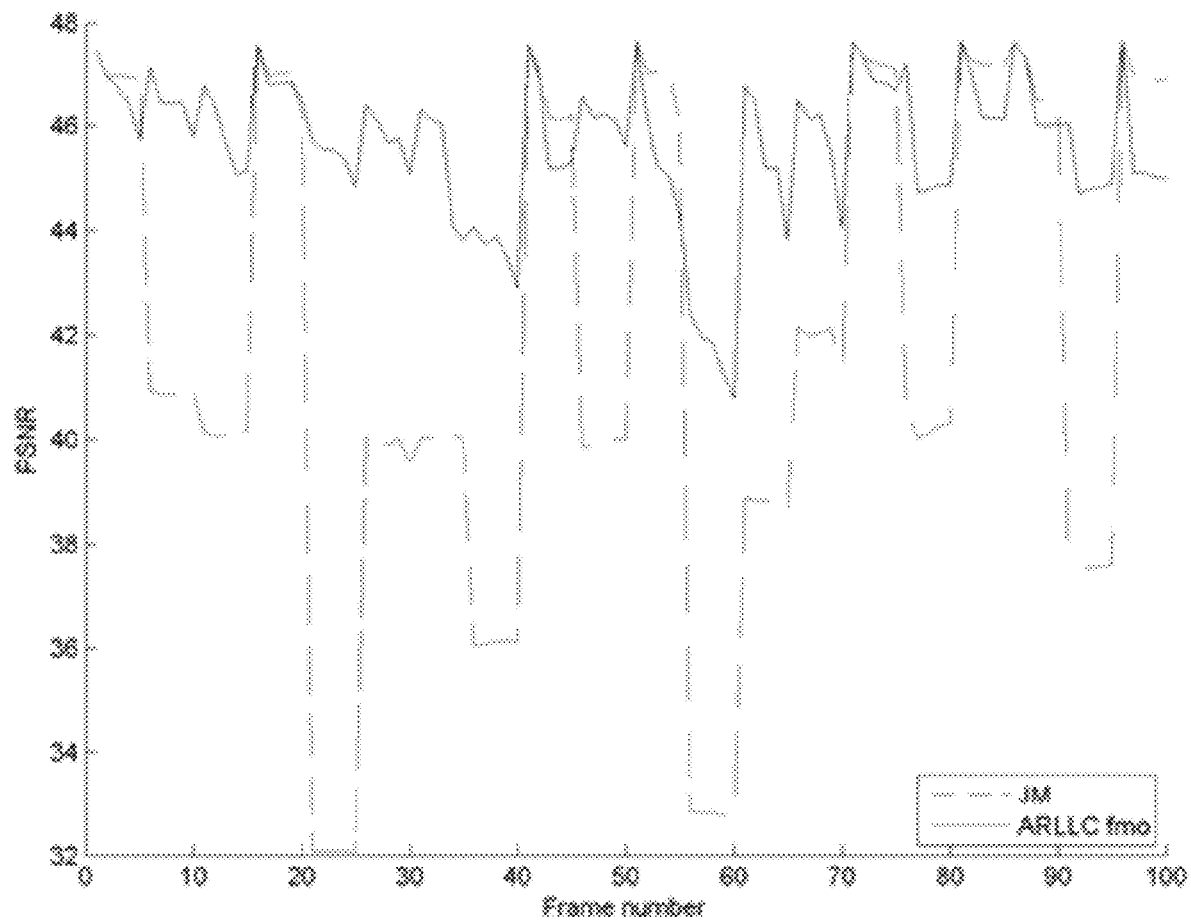
Fig. 11 Peak-Signal-to-Noise (PSNR) of Akiyo Video

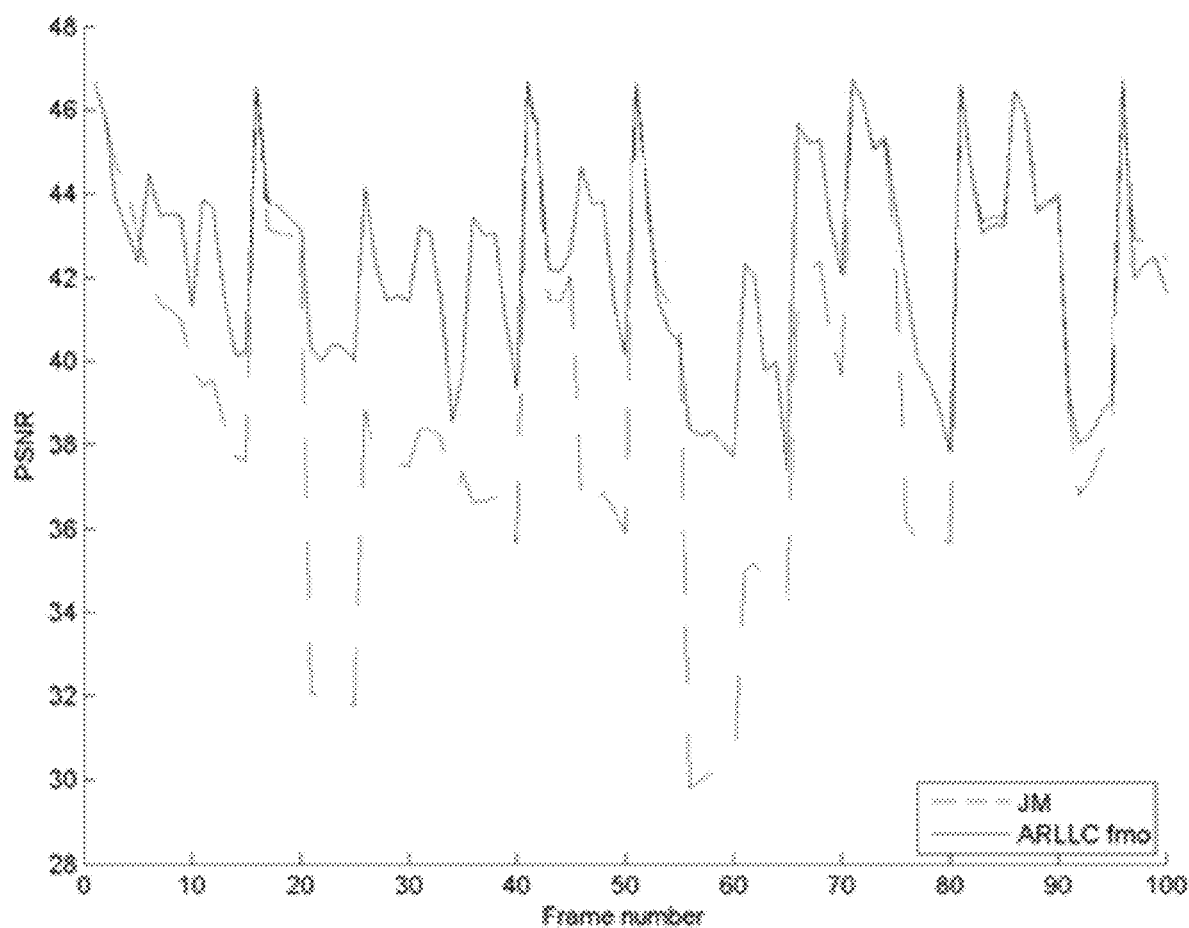
Fig. 12 Peak-Signal-to-Noise (PSNR) of Foreman Video

METHOD AND SYSTEM FOR HIGH PERFORMANCE VIDEO SIGNAL ENHANCEMENT

BACKGROUND OF THE INVENTION

Compressed video data are sent in packets over a communication channel, which can be a wired or a wireless channel. Due to channel interference, bits can be corrupted during transmission. In data packets, a corrupted bit may cause the loss of the whole packet, which is extremely costly in video distribution because a lost packet can affect many subsequent frames in a video. When the transmission is using a TCP/IP protocol, receivers can ask senders to retransmit the lost packets repeatedly until a correct packet is received in some non-real-time applications. However, in real-time video applications, such as, video broadcasting, video conferencing, video chatting, and video streaming, etc., packet retransmission will introduce excessive delay and also inefficient bandwidth usage. Existing video error concealment algorithms are known. Some examples are as shown in:

1. D. Nguyen, M. Dao and T. D. Tran, "Video Error Concealment using Sparse Recovery and Local Dictionaries," IEEE Int. Conf on Acoustics, Speech, and Signal Processing (ICAS SP), May 2011.
2. Wei-Ying Kung, Chang-Su Kim, and C.-C. Jay Kuo, "Spatial and Temporal Error Concealment Techniques for Video Transmission Over Noisy Channels," IEEE Trans. on Circuits and Systems for Video Technology, Vol. 16, No. 7, July 2006.
3. J M, the reference software for the H264 standard as shown in http://iphome.hhi.de/suehring/tml/.

The examples as shown above use neighboring macroblocks (MBs) to conceal damaged MBs in I-frames and motion vectors of neighboring MBs to conceal errors in P-frames. These algorithms work well to certain extent in low percentage packet loss scenarios. It is well known that in real-time broadcasting and streaming applications, videos are normally encoded in the so-called "baseline mode" where there are more P-frames and fewer I-frames in order to reduce latency and save bandwidth. As a result, error propagation effects become very serious in the later frames inside a group-of-pictures (GOP) and the resulting video quality can be very poor. Recently, there is some new research based on sparsity based search as shown in example 1 above. However, the speed is extremely slow and hence not suitable for real-time applications.

BRIEF DESCRIPTION OF THE DRAWINGS

FIG. 1 shows a proposed error concealment architecture to deal with packet loss.

FIG. 2 shows a baseline flow chart with smart adjacent search.

FIG. 3 shows the creation of reference data cube using multiple workers (threads).

FIG. 4 illustrates the concealment steps for a neighboring macroblocks (MBs).

FIG. 5 shows a patch selection process.

FIG. 6 illustrates a patch search in the neighborhood of the previous frame.

FIG. 7 shows a lost packet containing a number of damaged MBs in sequential order.

FIG. 8 illustrates a smart adjacent search.

FIG. 9 shows a multithreaded workflow.

FIG. 10 shows a GPU approach workflow, multi-panel steps indicate parallel processing.

FIG. 11 shows a Peak-Signal-to-Noise (PSNR) of the Akiyo video.

FIG. 12 shows a Peak-Signal-to-Noise (PSNR) of the Foreman video.

BRIEF SUMMARY OF THE INVENTION

One embodiment of the present invention is to provide a method and system, which can effectively conceal video errors due to lost packets in the transmission.

Another embodiment of the present invention is to perform error concealment without incurring additional bandwidth usage.

Another embodiment of the present invention is to use current and previous frames to search for similar patches for the corrupted blocks in the current frame.

Another embodiment of the present invention is to incorporate smart search concept that can significantly speed up the search process.

A further embodiment of the present invention is that the concealment algorithm can be implemented in GPUs and multi-core CPUs.

DETAILED DESCRIPTION OF THE INVENTION

In video broadcasting and streaming, channel interference may introduce bit errors in the packets since compressed bit stream is usually contained in data packets. TCP/IP is not suitable in such situations, as it may introduce excessive delay. Instead, Real-Time-Streaming Protocol (RTP/RTSP), is normally used where no packet retransmission is performed. In H264 standard, there are some built-in mechanisms to cope with packet losses. In the encoder, users can choose some error resilient methods such as flexible macroblock ordering (FMO) to make the bit stream more tolerant to packet losses. In the decoder, the H264 standard uses neighborhood MB to conceal errors in I-frames and neighboring motion vectors to deal with losses in P-frames. Despite the built-in mechanism used in H264, the video quality is still not acceptable when there is packet loss during transmission.

As shown in FIG. 1, the present invention conceals errors in videos by performing some processing at the decoder outputs as explained further in detail below. Each frame of the many frames in a video is divided into many slices. Within each slice, there are numerous macro-blocks (MBs). In the error concealment algorithm of the present invention, the following steps are carried out:

1. For each frame, determine the damaged MBs locations;
2. Build a reference data cube using the previous one or two decoded frames; part of the current frame can also be used to build the reference data cube.
3. Re-rank the sub-blocks: For each damaged macroblock (MB), divide it into 4 quadrants sub-blocks. Form a sparse block where 3 sub-blocks contain known pixels from the neighbors and only 1 sub-block contains unknown pixels. Rank all the sparse blocks and determine the highest ranked sparse block.
4. Concealment
   4.1 Patch selection: Determine the location of sub-block in the current frame to be concealed
   4.2 For a sparse block containing the highest ranked sub-block, search the best patch in the reference data cube.

4.3 Compute matching scores and find the best few patches. Replace the sub-block with the best match.

4.4 Optional: Matrix or tensor construction using the best matched patches; the low rank part of the matrix or tensor construction will replace the sub-block containing unknown pixels with the selected patch. This step takes more computations and hence is optional.

5. Move to the next sub-block until all missing sub-blocks are concealed.

As shown in FIG. 2, the algorithm of the present invention consists of the following key modules: damaged MB location determination (dotted line rectangle), ref_frcube generation (mt_ftcube); re-rank sub-blocks; concealment (patch selection: selects sparse block); scoring and matching: selects best patch).

Step 1: Damaged MB Location Determination

Each MB (16×16) has header info and corrupted MBs can be determined by collecting info from headers in all the uncorrupted MBs in a frame.

Step 3: Re-rank Sub-blocks

Depending on which sub-blocks have the most "good neighbors", the next target location to patch is selected. Sub-block locations with 3 neighboring sub-blocks that were properly decoded have the highest rank. Sub-blocks with neighbors that have been concealed will have a lower rank.

Properly decoded neighbors contribute +10 to the rank of a given sub block. The max rank is 30 (3 properly decoded neighbors) and after concealment, the location of the patched sub-block is given the score (max neighbor rank −1), in this case, 10−1=9. Now if the next sub-block is adjacent to the one just patched, there would be a +9 contributing to the rank instead of a +10. If a sub-block has 3 concealed neighbors, it would have a rank of 27 (9+9+9) and would yield a score of 8 afterwards because the max neighbor rank is only 9 here. This strategy ensures that we are looking for patches and scoring them using the most accurate references, rather than using concealed patches to look for subsequent patches.

Pseudo codes for rerank_subblks are shown below.

--- rerank_subblks

---

Inputs:
   \*\*miss_subblks - list of missing sub-blocks, incudes processed and unprocessed blocks
   \*\*miss_scr - miss score matrix
   sblk_sz - sub-block size of 1 dimension
   misslen - number of missing sub-blocks
   msr - number of rows in miss_scr
   msc - number of columns in miss_scr
Outputs:
   \*rnk - will contain the rank of each sub-block in the list
Description:
   Reranking sub-blocks will rank blocks with the most number of good neighbors as higher, and those with fewer as lower ranks. Blocks already processed will generate a rank of −1.
Pseudo:
1. int * rerank_subblks(int miss_subblks, int sblk_sz, int miss_scr, int misslen, int msr, int msc, int *rnk) {
2.   for (ii from 0 to misslen){
3.     if(miss_subblks[ii] is processed){
4.       rnk[ii] = −1
5.     } else {
6.       int mxrank, mxrank_idx;
7.       calc_rank(miss_subblks[ii], sblk_sz, miss_scr, msr, msc, &mxrank, &mxrank_idx) //gives subresult of patch selection
8.       rnk[ii] = mxrank
9.     }end if else
10.   }end for
11.}end

---

Step 2: ref_frcube Generation

A user can select the number of past reference frames. For each frame, the ref_frcube is built by stacking every possible 16×16 block after vectorizing each block into a vector to form a big matrix. The video frames consist of Y, U, V components. U and V are up-sampled to the same dimension as Y. Consequently, there are 3 vectors (Y, U, V) in each block. Each column in the ref_frcube has 768 elements. In our experiments, we normally use the immediate past frame as the reference frame in the decoded picture buffer (DPB).

There is also an option in the design of the present invention. The undamaged blocks in the current frame to expand the ref_frcube can be used. This will help in certain situations where it is hard to find similar patches in the previous frame.

The ref_frcube creation takes time and can be created using multiple workers in parallel. As shown in FIG. 3, each worker focuses on one quadrant of the frame. The speed can be improved linearly with the number of workers.

Step 4: Concealment

A typical concealment process of the present invention can be described as follows. In the current corrupted frame f, consider one damaged image block $b_i$ of size L×L (say L=16). By dividing $b_i$ into 4 smaller sub-blocks $b_i = \cup_{j=1}^{4} p_{ij}$, recover each of these sub-blocks $p_{ij}$ step by step and then complete the block $b_i$. The first missing sub-block $p_{i1}$ is grouped with the three quarters of the upper left neighborhood to form a new patch of the same size L×L. This new patch is called sparse block. The partial information from the spatial neighborhood and all adjacent frames are exploited to fill in $p_{i1}$. After $p_{i1}$ is completed, it can be considered as known information and the same technique can be applied to recover $p_{i2}$. Then $p_{i3}$ and finally $p_{i4}$ are recovered in succession just like what have been done with $p_{i1}$ and $p_{i2}$. The four steps to complete one missing block can be illustrated as in FIG. 4.

Now considering how one patch, called $y_{ij}$, with three quarters of known information and one fourth of the unknown piece $p_{ij}$ can be concealed. Setting this patch as a reference patch, search within a given number of neighborhood frames for the best patch that are similar to $y_{ij}$. Only three fourth of known information in the patch $y_{ij}$ are used for the comparison of mean squared error (MSE) to find one candidate patch.

The concealment consists of a few steps, which are described below.

Patch Selection

An example is shown in FIG. 5 for illustrating the patch selection process. Based on the re-rank function outputs, a sparse block with the highest rank will be selected.

Patch Search in the ref_cube

As shown in FIG. 6, the implementation for patch search is first to create a sub-ref-cube in the neighborhood of the sparse block to be concealed. Then, the 3 sub-blocks in the sparse block is used to compare with those corresponding sub-blocks in some candidate patches/blocks in the sub-ref-cube. A score is computed by summing up all the residuals between the 3 sub-blocks. The scores will be ranked. Further, either choose the patch with lowest score or take the average of several patches with the lowest scores. Other complicated algorithms using matrix or tensor completion can also be used.

In practice, videos are coded in packets with each packet containing a number of macroblocks (MBs). The MBs in each packet may be in interleave or consecutive formats. A consecutive format is illustrated in FIG. 7. In this scenario, both top left and bottom right ends are concealed. The determination is based on the re-rank program mentioned earlier. Eventually, the concealment will meet somewhere in the middle.

The following sections describe some fast implementation ideas.

Implementation of Fast Search a. Hierarchical Search

This is a two-pass search algorithm. The first pass performs a coarse search of the candidate patches. The step size (s), which is defined as the number of column or rows to skip, is used to speed up the searching. For example, instead of searching every patch in the neighborhood of a missing patch, we only search patches that are separated by s rows. The number of savings will be $s^2$. The second pass will be searching in a very small neighborhood of the best patch found in the first pass. Normally, we only search 10 or 15 of the neighbor patches in the second pass.

b. Smart Adjacent Search

The basis for this idea is that neighboring missing sub-blocks should have their target patch in the reference frames relatively close together. Thus, if the current sub-block being processed is adjacent to an already processed sub-block, look for the target patch in a reduced size neighborhood around the target of the adjacent processed sub-block. If there are no processed adjacent blocks, use default search neighborhood around missing location. FIG. 8 illustrates the smart adjacent search concept.

Fast Scoring a. Downsampling in Scores

To generate the score, we usually compute the difference between all known samples between two patches. Now, we only compute the difference of a selected set of the samples. Here, if the downsampling step size is d in each column and row, then we can save the computations by $d^2$.

b. Use Y Only for In Scoring

The Y, U, V planes are correlated. To save computational time, it is possible to only use Y portion of scores to find the best match.

Worker Thread Approach

In this approach, we distribute the number of sub-blocks to be concealed by a number of worker threads. The main function called by threads is mt_conceal( ). This function is essentially the same as the main loop in the baseline program. The main thread produces all the necessary preprocessed data structures, and passes either a copy or a reference to each thread, depending on which structure it is. FIG. 9 illustrates the flow of the Worker Thread approach.

Each thread shares the list of sub-blocks to be concealed, as well as the current frame being concealed. These variables are locked by a mutex when being updated by each thread. Additionally, an unordered map data structure is used to map missing sub-block locations to the target locations they are patched by. This is used to optimize the number of Smart Adjacent Search triggers.

Threads are spawned after fr_miss, miss_scr, and mat_idx are created and destroyed after all sub-blocks have been processed. fr_miss, miss_scr, and mat_idx are generalized under the preprocessed additional data structures and also require a mutex, since they are updated as sub-blocks are processed by each thread. Major changes to the baseline program to introduce the worker threads were only made at the while loop of processing sub-blocks.

There was performance degradation as compared to the baseline performance implementation. This is due to the fact that with multiple threads working concurrently, many sub-blocks that are being processed may not see as many good neighbors as compared to when being processed by only one thread. This approach also utilizes as many of downsamplings as possible in order to reduce the time of processing per sub-block. Additionally, the Smart Adjacent Search may propogate errors if the first adjacent location found is incorrect. This results in subsequent adjacent blocks looking in a focused, but wrong, neighborhood of candidates.

Fast Implementation Using GRAPHICS PROCESSING UNIT (GPU)

In this approach, we examined critical portions of the code to speed up using CUDA, a parallel computing platform and application programming interface (API) model created by NVIDIA. These areas include the following:

Creating the reference cube
  Creating the sub cube
  Calculating the difference of scores
  Reducing the column scores
  Creating the patch (unnecessary, omitted in flowchart)
  Creating the reference cube—each thread copies a Y, U, and V value. There are 256 threads per pixel, and one block of threads per pixel in the frame.

Creating the sub cube—each thread copies a Y, U, and V value. There are 16×16 threads per pixel, and one block per pixel in the neighborhood range.

Calculating the difference of scores—each thread calculates one difference. Each block has 16×16×3 threads and the grid contains one block per pixel in the neighborhood range.

Reducing the column scores—each thread calculates the sum of the differences calculated in the previous step, which is sum of 16×16×3 elements, so the total number of threads is equal to the number of pixels in the neighborhood range. This step was slightly slow as we are unable to find an optimized reduction algorithm.

When considering design restrictions, it was important to try minimizing the number of memory transfers between GPU and CPU memory. After the initial cudaMemcpy of the input frame, the reference cube is never copied back to CPU memory after it is created. Once the sparse block has been selected, the information is copied to GPU for further processing. Other larger data structures kept in CPU memory include fr_miss, miss_scr, and mat_idx, all used to indicate which macroblock locations have been processed.

Some experimental results by integrating the concealment algorithm of the present invention in JM, the reference software for the H264 standard, are shown below.

The present invention integrates the video error concealment software (baseline version) into JM. Two videos (Akiyo and Foreman) were used to demonstrate the performance gain of the software of the present invention with respect to that of JM. In each video, the group of picture consists of 1 I-frame and 9 P-frames. There are 100 frames in each video. FMO is included in the encoding process. Each packet contains 20 MBs. FIG. 11 and FIG. 12 show the peak-signal-to-noise (PSNR) of JM and the software of the present invention for the Akiyo and Foreman videos. It can be seen that the software of the present invention performs consistently better than the normal error concealment software in JM. The present invention is applicable to all types of videos, e.g. monochrome, color, multispectral, hyperspectral, and high definition, etc.

It will be apparent to those skilled in the art that various modifications and variations can be made to the system and method of the present disclosure without departing from the scope or spirit of the disclosure. It should be perceived that the illustrated embodiments are only preferred examples of describing the invention and should not be taken as limiting the scope of the invention.

The invention claimed is:

1. A method for video signal error concealment in video broadcasting and streaming, comprising the steps of:
   A. determining location of damaged macroblocks (MBs) by collecting information from headers in all uncorrupted MBs;
   B. building a reference data cube using one or two previously decoded frames;
   C. re-ranking sub-blocks by:
      i. dividing each of the damaged MBs into 4 quadrants of sub-blocks;
      ii. forming sparse blocks from the sub-blocks;
      iii. ranking all the sparse blocks to determine a highest ranking sparse block by Fast Scoring comprising the steps of:
         1) selecting only sparse blocks in one plane of a YUV planes; and
         2) computing difference of the selected set of sparse blocks;
      iv. searching data patches in the reference data cube for the highest ranking sparse block by a Fast Searching technique comprising the steps of:
         1) performing a first pass coarse search of the data patches by selected rows; and
         2) performing a second pass of searching adjacent neighborhood of best patches found in the first pass;
   D. concealing the video signal error using the highest ranking sparse blocks by:
      i. computing matching scores of the data patches and finding best matched data patches;
      ii. repairing the damaged MBs with the best matched data patches using multiple workers in parallel wherein each worker focuses on only one quadrant of the sub-blocks.

2. A method for video signal error concealment according to claim 1, wherein the reference cube is constructed by multiple workers using Graphical Processing Unit (GPU) and multi-core Central Processing Unit (CPU) in real-time.

3. A method for video signal error concealment according to claim 1, wherein the reference data cube building step also using pant of a current frame of the video signal; and the matching score computing step is sum of differences between two data patches.

4. A method for video signal error concealment according to claim 1, wherein 3 of the sparse sub-blocks formed are from known pixels of neighboring MBs, and only 1 of the sub-blocks contains unknown pixels.

5. A method for video signal error concealment according to claim 4, wherein the concealing step further comprising the step of: selecting a data patch by determining the location of sub-block in a current frame to be concealed.

* * * * *